Figure 1:
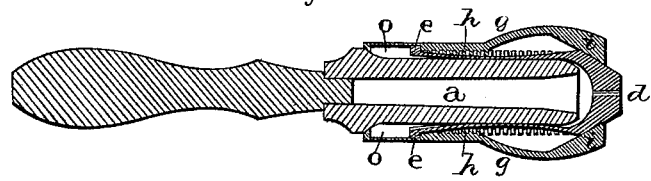
Figure 2:
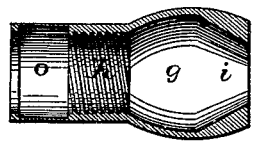
Figure 3:
Figure 4:

W. F. CURTIS.
BIT-STOCKS.

No. 180,850.        Patented Aug. 8, 1876.

WITNESSES.
INVENTOR:
Wm. F. Curtis
per
F. A. Lehmann, Atty.

UNITED STATES PATENT OFFICE.

WILLIAM F. CURTIS, OF MILLER'S FALLS, MASSACHUSETTS.

IMPROVEMENT IN BIT-STOCKS.

Specification forming part of Letters Patent No. 180,850, dated August 8, 1876; application filed April 11, 1876.

*To all whom it may concern:*

Be it known that I, WILLIAM F. CURTIS, of Miller's Falls, in the county of Franklin and State of Massachusetts, have invented certain new and useful Improvements in Bit-Stocks; and I do hereby declare the following to be a full, clear, and exact description of the invention, such as will enable others skilled in the art to which it pertains to make and use it, reference being had to the accompanying drawings, which form part of this specification.

My invention relates to an improvement in bit-stocks; and it consists in the arrangement and combination of parts that will be more fully described hereinafter, whereby a simple, cheap, and effective stock is produced.

The accompanying drawings represent my invention.

$a$ represents the stock, having a screw-thread cut in its periphery nearly its entire length, and having a groove, $c$, cut in opposite sides, the ends of which grooves curve in opposite directions. In these grooves are placed the two spring-jaws $d$, which have their outer ends made thick and heavy, and so shaped as to hold the tool being used, while upon the flat spring end is formed the flange $e$. Screwing on the stock over the two spring-jaws is the shell or nut $g$, which has the interior of the outer end beveled away inward, so as to form a clamp, $i$, for pressing the two jaws together upon the tool, and a screw-thread, $h$, formed near its center for engaging with the thread upon the stock, and which has a recess, $o$, formed in its inner end, in which the flanges $e$ on the jaws catch. By means of this recess $o$ and the flanges $e$ on the jaws, the jaws are moved in and out with the nut, for the purpose of opening them to their widest capacity or closing them tightly upon the bit. As the nut is moved outward the elasticity in the jaws causes them to spring open and remain in that position until the clamp $i$ forces them together.

I am aware that recesses have been cut in the side of the stock to receive the jaws, and that the jaws have been forced outward by springs and carried back by the nut, and this I disclaim. In my stock the jaws are both moved in and out by the nut, and each jaw being a spring, they always stand apart when open.

Having thus described my invention, I claim—

1. The spring-jaws $d$, having the flanges $e$ on their inner ends, substantially as shown.

2. The combination of the threaded stock $a$, having the grooves $c$, spring-jaws $d$, nut $g$, and recess $o$, substantially as set forth.

In testimony that I claim the foregoing I have hereunto set my hand and seal this 29th day of March, 1876.

WILLIAM F. CURTIS. [L. S.]

Witnesses:
 JOHN B. HUNT,
 EDWIN T. LUEY.